United States Patent [19]

Foster

[11] Patent Number: 4,984,679
[45] Date of Patent: Jan. 15, 1991

[54] SEAL BETWEEN RECIPROCATING CONVEYOR FLOOR MEMBERS

[76] Inventor: Raymond K. Foster, P.O. Box 1, Madras, Oreg. 97441

[21] Appl. No.: 498,025

[22] Filed: Mar. 23, 1990

[51] Int. Cl.$^5$ ............................................. B65G 25/04
[52] U.S. Cl. ................................. 198/750; 414/525.1
[58] Field of Search ...................... 198/750; 414/525.1, 414/525.9

[56] References Cited

U.S. PATENT DOCUMENTS

| | | | |
|---|---|---|---|
| 4,144,963 | 3/1979 | Hallstrom | 198/750 |
| 4,492,303 | 1/1985 | Foster | 198/750 |
| 4,679,686 | 7/1987 | Foster | 198/750 |
| 4,727,978 | 3/1988 | Hallstrom, Jr. | 198/750 X |
| 4,749,075 | 6/1988 | Foster | 198/750 |
| 4,793,469 | 12/1988 | Foster | 198/750 |
| 4,821,868 | 4/1989 | Foster | 198/750 |
| 4,896,761 | 1/1990 | Foster | 198/750 |

*Primary Examiner*—H. Grant Skaggs
*Assistant Examiner*—D. Glenn Dayoan
*Attorney, Agent, or Firm*—Delbert J. Barnard

[57] ABSTRACT

An elongated seal strip (38) is provided between adjacent floor slat members (10, 10', 10") in a reciprocating floor conveyor. The seal strip (38) includes an inboard base (40) which is received in a sidewall groove (30) and an outboard portion (42) which extends laterally outwardly from the groove (30). The outboard portion (42) is composed of a first layer (46) joined to a second layer (48), such as by co-extrusion. The first layer (46) is a relatively hard material with good wear characteristics and a low coefficient of friction. The second layer (48) is a softer but more resilient material. The combined thickness of the two layers (46, 48) is greater than the gap width between adjacent floor slat members (10). As a result, the resilient (48) must be compressed in order to install the outboard portion (42) of the seal strip (38) into the gap between adjacent floor slat members (10). During use, the layer (48) provides a resilient backing for the layer (46), continuously urging it into sealing contact with the confronting side surface of the adjacent floor slat member. The resilient layer (48) continuously changes in thickness to accommodate for changes in the gap width, caused by the relative movement of the floor slat members (10) to each other, for whatever reason.

6 Claims, 3 Drawing Sheets

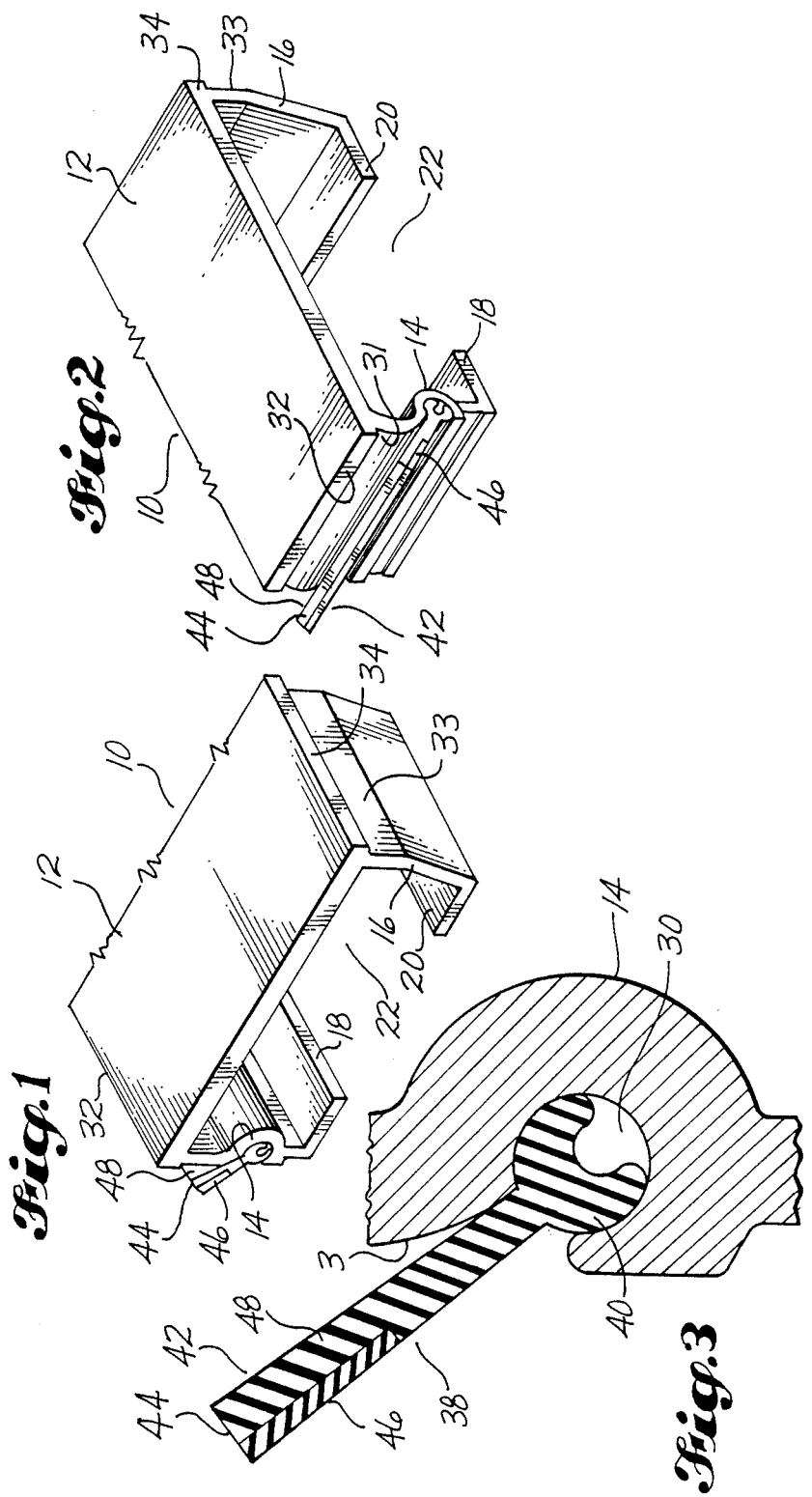

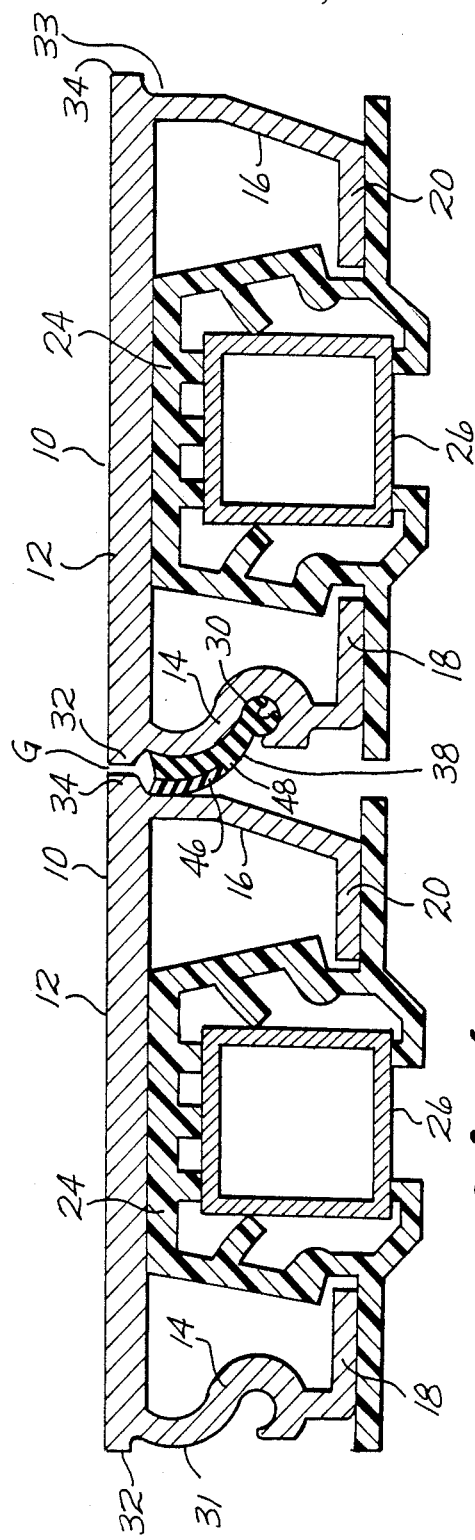
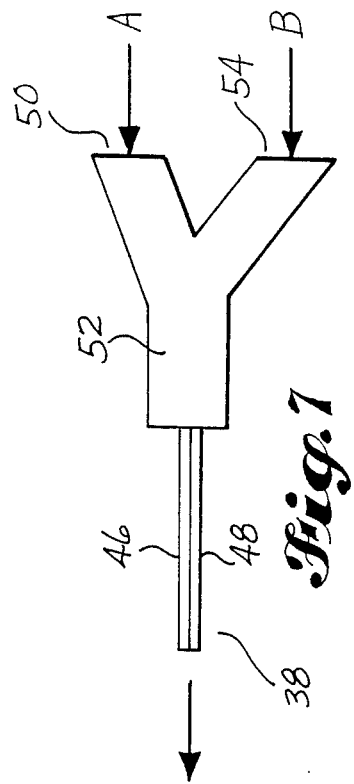

SEAL BETWEEN RECIPROCATING CONVEYOR FLOOR MEMBERS

DESCRIPTION

1. Technical Field

This invention relates to reciprocating floor conveyors having elastomeric seals between adjacent floor members. More particularly, it relates to the provision of an improved elastomeric seal, characterized by a hard surface with good wear characteristics and a low coefficient of friction which contacts a confronting, moving side surface of an adjacent floor slat member, and a resilient second layer which resiliently urges the first layer into sliding sealing contact with the side surface of the floor slat member, while compressing and expanding to compensate for changes in the gap width during operation of the conveyor and at all times filling the gap and substantially excluding foreign material from entering into the gap between the two relatively moving floor slat members.

2. Background Art

My U.S. Pat. No. 4,896,761, granted Jan. 30, 1990, and entitled, "Reciprocating Conveyor Floor Members and Seals," discusses prior art seal strips and their problems. U.S. Pat. No. 4,896,761 discloses an improved seal strip and floor member construction which was developed to solve some of the problems of the prior seal strips. The seal strip of the present invention, and its relation to, and combination with floor slat members of a particular construction, constitute yet another improved seal.

A principal object of the present invention is to provide a seal strip which has a hard seal face where relative movement occurs, characterized by good wear characteristics and a low coefficient of friction, backed up by a cushioning body which urges the hard seal face against a confronting side surface of a relatively moving adjacent floor slat member, for maintaining good sealing contact at the seal face despite changes in gap width between floor slat members during conveyor operation.

SUMMARY OF THE INVENTION

The improved seal strip of the present invention is provided for use in a reciprocating floor conveyor which is composed of side-by-side floor members, each having a top and first and second downwardly-depending opposite sides. The first side of each floor member closely confronts the second side of an adjacent floor member. A gap is formed by and between the two sides. The elongated seal strip has a base portion which is connected to the first side of each floor member. It also includes an outboard portion which is situated in the gap and contacts the second side of the adjacent floor member.

The seal strip of the present invention is basically characterized by an outboard portion which includes a first layer of plastic material which is in contact with the second side of the adjacent floor slat member. This first layer is relatively hard and has a relatively low coefficient of friction. The outboard portion further includes a second backing layer which is secured to the first layer. The backing layer is constructed of a more resilient material. The first and second layers together give the outboard portion of the seal strip a thickness that is greater than the width of the gap. The second layer is sufficiently resilient that it will compress an amount sufficient to allow the outboard portion to fit into the gap without exerting a drag force between the slat members of such a magnitude that there is interference with free longitudinal movement of the slat members. The seal strip outboard portion substantially always fills the gap between the floor slat members.

Other objects, features and advantages of the invention are hereinafter described as a part of the best mode of the invention.

BRIEF DESCRIPTION OF THE DRAWINGS

Like reference numerals are used to designate like parts throughout the several views of the drawing, and:

FIG. 1 is a fragmentary pictorial view of an end portion of a floor member and seal strip according to the preferred embodiment of the invention;

FIG. 2 is a fragmentary pictorial view showing the opposite side of that shown in FIG. 1;

FIG. 3 is a fragmentary cross-sectional view of a seal strip positioned in a longitudinal retaining groove;

FIG. 4 is a cross-sectional view showing a pair of installed floor members according to the preferred embodiment of the invention;

FIG. 7 is a schematic diagram of co-extrusion process for forming and joining the two layers of the seal strip.

BEST MODE FOR CARRYING OUT THE INVENTION

Figure 5:
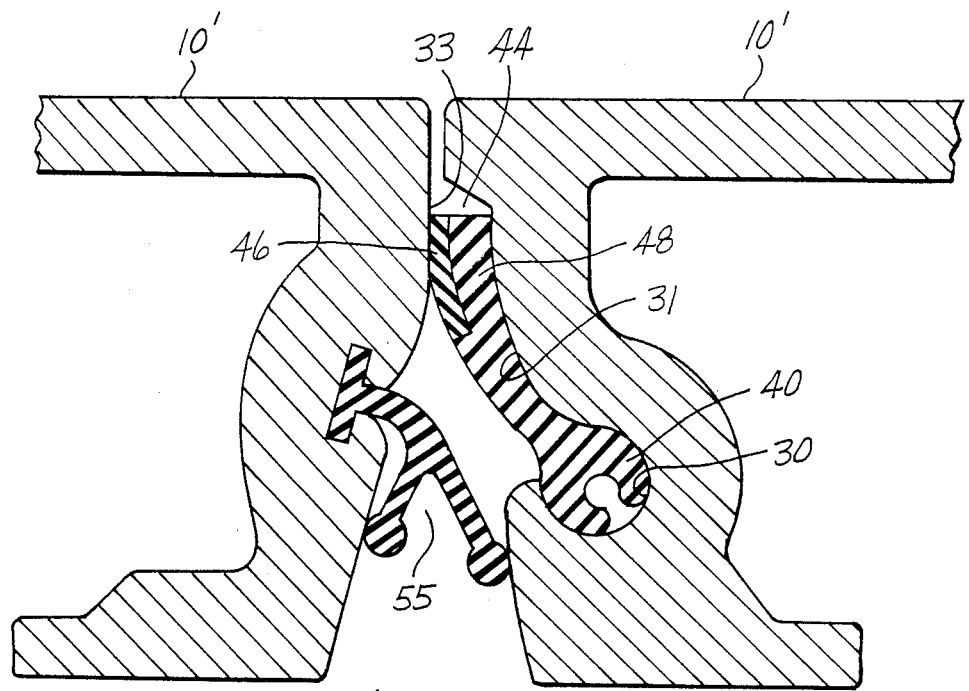
FIG. 5 is an enlarged scale view of adjoining side portions of adjacent floor members, showing a modified construction of a gap between the floor members, and showing the seal strip of the invention within said gap.

My aforementioned U.S. Pat. No. 4,896,761, granted Jan. 30, 1990, and entitled, "Reciprocating Conveyor Floor Members and Seals," discloses a floor member, seal strip, and support bearing assembly which, for at least some loads, can be improved by utilization of the present invention. My U.S. Pat. No. 4,821,868, which issued Apr. 18, 1989, and entitled "Drive/Frame Assembly for a Reciprocating Floor," discloses a presently-preferred embodiment of a reciprocating floor conveyor. My U.S. Pat. No. 4,492,203, issued Jan. 8, 1985, and entitled, "Drive/Slant Guide System for a Reciprocating Floor Conveyor," discloses a preferred support and guide frame construction for floor members. Longitudinal floor members are connected to transverse drive beams which reciprocate back and forth longitudinally of the floor within a relatively small space. Transverse drive beams for the floor members are positioned on both sides of the space. The longitudinal guide members are supported on and connected to transverse support beams. Plastic slide bearings are secured to the guide beams at locations where the guide beams set down on the transverse support beams. My U.S. Pat. No. 4,679,686, issued July 14, 1987, and entitled, "Bearing System for Reciprocating Floor Conveyors," discloses plastic slide bearings which are constructed to be snapped into place on the longitudinal guide beams and which are constructed to allow the floor members to be snapped into place from above. The contents of U.S. Pat. Nos. 4,896,761; 4,821,868; 4,492,303; and 4,679,686 are hereby expressly incorporated into this patent by this specific reference.

As disclosed in the aforementioned patents, the floor members of a reciprocating floor conveyor are moved in one direction to advance a load and are retracted in the opposite direction. The floor members are divided into three sets. All of the floor members are moved in the first direction to advance the load. They are retracted one set at a time until all floor members are at a "start" position. The operation is then repeated. The present invention may also be usable in a reciprocating floor conveyor in which more than one half of the floor members are always advancing while the remaining floor members are returning at a higher rate of speed.

Referring to the several figures of the drawings, and first to FIGS. 1 and 2, therein is shown a portion of a longitudinal floor member 10 according to the preferred embodiment of the invention. Each floor member 10 includes a top panel 12, a pair of opposite, downwardly-extending sides 14, 16, and a pair of opposite, inwardly-directed flange portions 18, 20 which define a space 22 between them. Each floor member 10 is supported on a by a plurality of plastic bearings 24 which are, in turn, mounted on an elongated tubular support beam 26 (FIG. 4). These support beams 26 are welded or otherwise secured to a support frame for the floor.

The first side 14 of each floor member includes a vertically convex side surface 31 above a longitudinal retaining groove 30 up to a first lip 32. The second side 16 of each floor member 10 may include a similar lip 34. It also includes an upper side surface region 33 which extends doWnwardly from the lip 34, in confronting relationship to the convex surface 30.

Much as in a manner disclosed in the aforementioned U.S. Pat. No. 4,896,761, the elongated seal strip 38 includes an inboard base portion 40 which is shaped to be received in and restrained by the retaining groove 30. Extending outwardly from the base portion 40 is an outboard portion 42. The outboard portion 42 extends outwardly from the retaining groove to a free edge 44.

As shown by FIG. 3, the outboard portion 42 of the seal strip 38 comprises a first layer 46 and a second layer 48. In preferred form, the second layer 48 is a major part of the outboard portion of the seal strip and it is formed integrally with the base portion 40. The first layer 46 is preferably both thinner and narrower than the second layer 48. It is formed from a material which is relatively hard and has a relatively low coefficient of friction. The second layer 48 is constructed from a more resilient material. The combined thickness of the two layers 46, 48, i.e., the thickness of the outboard portion 42 of the seal strip 38, is wider than the width of the gap. When the outboard portion 42 of the seal strip 38 is within the gap, the second layer 48 is compressed by the dimensional difference. In other words, the layer 48 becomes compressed as the outboard portion 42 is inserted into the gap. This insertion step may be as disclosed in the aforementioned U.S. Pat. No. 4,896,761, i.e., by a downward movement of a floor slat member.

The resilient nature of the second layer 48 permits the seal strip outboard portion 42 to conform to the width of the gap. This conformance continues throughout operation of the floor. In some installations, the floor members move laterally together and apart, because of relative lateral movement of the floor member supports. This is because the floor member supports are, in many cases carried by a vehicle and the vehicle frame twists and moves during movement of the vehicle. This relative movement of frame portions of the vehicle is transferred to the support frames for the floor slat members and thus to the floor slat members themselves. Untrue longitudinal surfaces also result in gap width changes during reciprocation. The seal strip of the present invention permits such movement to be accommodated while, at the same time, maintaining a filler body within the gap which blocks movement of small particles into the gap and into the region below the seal strip member 38.

The first layer 46 is formed from a plastic material that is relatively hard while, at the same time, having a relatively low coefficient of friction. The relative hardness allows the first layer 46 to assume a substantial amount of wear at the surface where relative movement occurs. The second layer 48 provides a cushioned backing for the first layer 46. The softer, more resilient material can be used at this location because there is not sliding movement between layer 48 and its floor member. Accordingly, the seal strip of the present invention is a resiliently-cushioned, hard face seal. The resilient cushion or backing maintains sliding contact between layer 46 and the second side surface of the adjacent floor slat member. The thickness of layer 48 changes in response to changes in the gap width, throughout the full width of the gap, while at the same time maintaining a constant force on layer 46, continuously urging it into sliding contact with the adjacent floor slat member.

FIG. 5 shows a slightly modified construction of the floor members. The lip on the second side of the floor member 10' is eliminated. Also, the second side of the floor slat member 10' is shown to be carrying what is referred to as a "splash up" seal 55. This seal is disclosed by, and in part forms the subject matter of, my co-pending U.S. application Ser. No. 07/346,784, filed May 3, 1989, and entitled, "Seals for Reciprocating Conveyor Floor Members."

Figure 6:
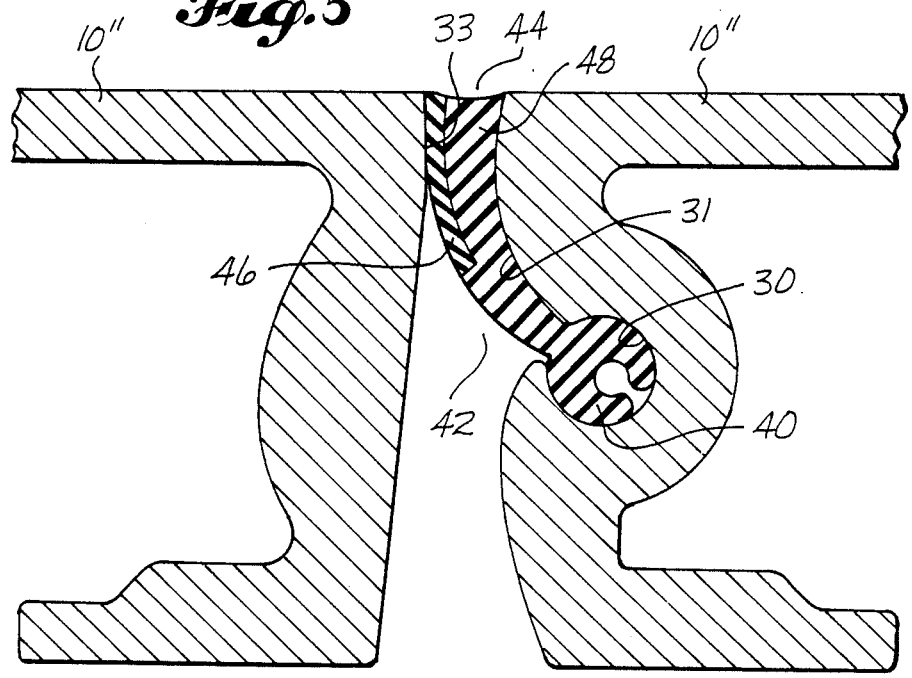
FIG. 6 is a view like FIG. 5, but of yet another embodiment of the invention.

FIG. 6 illustrates yet another embodiment of floor slat member. This embodiment does not include a lip on either floor member 10". Instead, the free edge part of the outboard portion 42 of seal strip 38 is located between confronting side surfaces of adjacent floor slat members 10". Such free edge part includes an edge surface which, when the seal is installed, is directed upwardly.

In the embodiments of FIGS. 5 and 6, as in the preferred embodiment, the outboard portion 42 of the seal strip 38 has an uncompressed or static thickness that is greater than the gap width into which the outboard portion 42 is to be fitted. According to the invention, this is essential so that, when the seal strip is installed, there will essentially always be some compressions of the layer 48. Thus, the layer 48 will always act as a spring and will always act to bias the layer 46 into contact with the side surface of the second floor slat member, in the manner described above, to obtain the advantages which are also described above.

Referring to FIG. 7, a first material A is shown to be delivered into a first inlet 50 of a co-extrusion die 52. A second material B is shown being delivered into a second inlet 54 of the same die 52. Material A forms the first layer 46. Material B forms the second layer 48 and, in the preferred embodiment, also the base portion 40 of the seal strip 38. Co-extrusion technology is known and, for that reason, the details of the equipment and process used need not be disclosed and are not disclosed. The material A first goes through a die which forms it into the cross-section of layer 46. The material B goes through a die which forms it into the cross-section of the remaining portion of the seal strip 38. These two portions of the seal strip are then joined, while hot, in a downstream portion of the die 52, to complete extrusion of the seal strip 38. The seal strip 38 which emerges from the die 42 is a onepiece construction, with the layer 46 being so firmly bonded to the layer 48 that the resulting seal strip can be considered to be a one-piece structure even though a portion of it is relatively hard and a second portion is relatively resilient.

The division of the seal strip 38 into the two layers or portions 46, 48 can occur at a different location than is illustrated. However, what is important is that the wear surface 46 be the surface that is in contact with the relatively moving surface of the adjacent floor slat member and such wear surface 48 be urged into sealing contact with the floor member surface by the more resilient layer 48.

Co-extrusion is per se an old and known process. It is also known to use this process for bonding together materials having differing characteristics of hardness, etc. It is also known to use different formulations of the same material for changing the hardness and other characteristics of the material. Polyurethane is a suitable material for both layers 46, 48 of the seal strip 38. This material can be formulated to produce a layer 46 having the desired characteristics of hardness and low coefficient of friction. The same material may be formulated to create the layer 48 which has the desired amount of resilience, so that it will perform the above-described function for layer 48. According to the invention, the layer 46 has greater wear characteristics and a lower coefficient of friction than the layer 48. The layer 48 has more resilience than the layer 46. When the two layers 46, 48 are joined, the composite seal portion 42 is laterally resilient, so that it can be fit into a gap which is narrower than the portion 42 is thick. The resilience force is selected such that the force at the seal face, where sliding contact occurs, will not cause too severe of drag forces, i.e., it will not interfere with free and easy longitudinal movement of the floor slat members. The coefficient of friction characteristics of the layer 46 are chosen so as to also prevent untolerable drag.

It is believed that the seal strip can also be constructed from such other plastic materials as Teflon (trademark), Delrin (trademark), Nylon (trademark), and polyethylene. Some of these materials can be formulated so as to be substantially self-lubricating.

It is to be understood that the disclosed embodiments are submitted for the purpose of providing examples of the invention. The scope of protection is not to be limited by the details of these embodiments, but rather only by the following claims, interpreted by the established rules of patent claim interpretation, including use of the doctrine of equivalents.

What is claimed is:

1. In a reciprocating floor conveyor composed of side-by-side floor members, each having a top and first and second downwardly depending opposite sides, with the first side of a first floor member closely confronting the second side of an adjacent second floor member and forming therewith a gap between said floor members, and an elongated seal strip within said gap having a base portion connected to the first side of the first floor member and an outboard portion in the gap and contacting the second side of the second floor member, an improved seal, comprising:

said outboard portion including a first layer of plastic material which is in contact with the second side of the second floor slat member, said first layer being relatively hard and having a relatively low coefficient of friction;

a second backing layer secured to the first layer, said backing layer being constructed of a relatively resilient material;

said first and second layers together giving the outboard portion a thickness that is greater than the width of the gap;

said second layer being sufficiently resilient that it will compress an amount sufficient to allow the outboard portion to fit into the gap without exerting a drag force between the slat members of a size to interfere with free longitudinal movement of the slat members; and said seal strip lip substantially always filling the gap between the two floor members.

2. An improved seal strip according to claim 1, wherein said first layer of plastic material is thinner than the second layer.

3. An improved seal strip according to claim 2, wherein the first strip of plastic material is narrower than the outboard portion of the seal strip.

4. An improved seal strip according to claim 1, wherein the outboard portion of the seal strip increases in thickness as it extends transversely outwardly from the base portion of the seal strip.

5. An improved seal according to claim 1, wherein said first layer of plastic material is integrally joined to the second layer.

6. An improved seal strip according to claim 5, said seal strip being formed by extrusion and said first layer being integrally joined to the second layer by co-extrusion of the two layers.

* * * * *